(12) United States Patent
Bernard et al.

(10) Patent No.: US 6,231,797 B1
(45) Date of Patent: May 15, 2001

(54) METHOD FOR FORMING A RETROREFLECTIVE SHEETING

(75) Inventors: Gus Bernard, West Hartford; Jay Soaft, New Britain, both of CT (US)

(73) Assignee: Reflexite Corporation, Avon, CT (US)

(*) Notice: Subject to any disclaimer, the term of this patent is extended or adjusted under 35 U.S.C. 154(b) by 0 days.

(21) Appl. No.: 09/469,856

(22) Filed: Dec. 22, 1999

Related U.S. Application Data

(63) Continuation of application No. 08/976,095, filed on Nov. 21, 1997, now Pat. No. 6,039,909, which is a continuation of application No. 08/443,836, filed on May 18, 1995, now Pat. No. 6,143,224.

(51) Int. Cl.[7] .................................................. B29G 33/40
(52) U.S. Cl. ............................ 264/220; 264/1.9; 156/247
(58) Field of Search ........................... 428/60, 161, 323, 428/331, 338, 339, 343, 352, 354, 542.6; 427/212, 180; 264/1.9, 220; 156/247

(56) References Cited

U.S. PATENT DOCUMENTS

| | | |
|---|---|---|
| 2,380,447 | 7/1945 | Jungesen .................................. 88/78 |
| 2,948,191 | 8/1960 | Hodgson, Jr. et al. ................... 88/82 |
| 3,190,178 | 6/1965 | McKenzie ................................ 88/82 |
| 3,265,551 | 8/1966 | Ananian et al. ...................... 156/219 |
| 3,684,348 | 8/1972 | Rowland ............................... 350/103 |
| 3,689,346 | 9/1972 | Rowland ............................... 156/245 |
| 3,712,706 * | 1/1973 | Stamm .................................. 350/103 |
| 3,810,804 | 5/1974 | Rowland ............................... 156/245 |
| 3,811,983 | 5/1974 | Rowland ............................... 156/245 |
| 3,935,359 | 1/1976 | Rowland ............................... 428/172 |
| 3,975,083 | 8/1976 | Rowland ............................... 350/103 |
| 3,992,080 | 11/1976 | Rowland ............................... 350/103 |
| 4,075,049 | 2/1978 | Wood .................................... 156/220 |
| 4,235,512 | 11/1980 | Brasfield et al. ..................... 350/105 |
| 4,243,618 | 1/1981 | Van Arnam ............................... 264/1 |
| 4,244,683 | 1/1981 | Rowland ............................... 425/143 |
| 4,555,161 | 11/1985 | Rowland ............................... 350/103 |
| 4,618,518 * | 10/1986 | Pricone et al. ......................... 428/40 |
| 4,637,950 | 1/1987 | Bergeson et al. ..................... 428/168 |
| 4,703,999 | 11/1987 | Benson ................................. 350/103 |
| 4,801,193 | 1/1989 | Martin ................................. 350/103 |
| 4,844,976 | 7/1989 | Huang .................................. 428/323 |
| 5,139,590 | 8/1992 | Wyckoff ................................. 156/71 |
| 5,171,624 | 12/1992 | Walter ................................. 428/156 |
| 5,229,882 * | 7/1993 | Rowland ............................... 359/530 |
| 5,264,063 * | 11/1993 | Martin ................................. 156/247 |
| 5,300,783 | 4/1994 | Spencer et al. .................... 250/462.1 |
| 5,491,586 | 2/1996 | Phillips ................................ 359/530 |
| 5,501,545 | 3/1996 | Walter .................................. 404/14 |

FOREIGN PATENT DOCUMENTS

| | | |
|---|---|---|
| 28 28 588 A1 | 1/1980 | (DK) . |
| 0 142 250 A2 | 9/1984 | (EP) . |
| 0 560 107 A1 | 9/1993 | (EP) . |

* cited by examiner

Primary Examiner—Merrick Dixon
(74) Attorney, Agent, or Firm—Hamilton, Brook, Smith & Reynolds

(57) ABSTRACT

The method for forming a retroreflective sheeting includes providing a first layer and forming a prism array on the first layer. A second layer is applied to the prism array. The first thermoplastic layer is welded to the second thermoplastic layer, while applying a die to the layers to dislocate a portion of the prism array, thereby allowing the first layer to be bonded to the second layer at the portion.

17 Claims, 6 Drawing Sheets

METHOD FOR FORMING A RETROREFLECTIVE SHEETING

RELATED APPLICATIONS

This application is a continuation of U.S. application Ser. No. 08/976,095, U.S. Pat. No. 6,039,909 filed Nov. 21, 1997, which is a continuation of U.S. application Ser. No. 8/443,836, U.S. Pat. No. 6,143,224 filed May 18, 1995, the entire teachings of both being incorporated herein by reference.

BACKGROUND OF THE INVENTION

Retroreflective materials are employed for various safety and decorative purposes. Particularly, these materials are useful at night time when visibility is important under low light conditions. With perfect retroreflective materials, light rays are reflected essentially towards a light source in a substantially parallel path along an axis of retroreflectivity. For many applications, perfect retroreflectivity is not required. Rather, a compromise is required in which a cone of divergence is provided which permits a degree of divergence which enables enough divergent light to strike the viewer's eye, yet not so much that the intensity of the reflective light at the viewer's eye is unduly diminished. Under circumstances where the only source of illumination is the headlights of an automobile on an unlit road, the ability to retroreflect a cone of divergence to the eye of the driver is important for safety reasons.

Many types of retroreflective material exist for various purposes. These retroreflective materials can be used as reflective tapes and patches for clothing, such as vests and belts. Also, retroreflective bands can be used on posts, barrels, traffic cone collars, highway signs, warning reflectors, etc. Retroreflective material may be comprised of arrays of randomly oriented micron diameter spheres or close packed cube-corner (prismatic) arrays.

Cube-corner or prismatic retroreflectors are described in U.S. Pat. No. 3,712,706, issued to Stamm on Jan. 23, 1973. Generally, the prisms are made by forming a master negative die on a flat surface of a metal plate or other suitable material. To form the cube-corners, three series of parallel equidistance intersecting V-shaped grooves 60 degrees apart are inscribed in the flat plate. The die is then used to process the desired cube-corner array into a rigid flat plastic surface.

When the groove angle is 70 degrees, 31 minutes, 43.6 seconds, the angle formed by the intersection of two cube faces (the dihedral angle) is 90 degrees and the incident light is reflected back to the source. For automobile headlight reflectors, the dihedral angle is changed so that the incidental light is reflected nonorthogonally towards the driver instead of the source.

The efficiency of a retroreflective structure is a measure of the amount of incidental light returned within a cone diverging from the axis of retroreflection. Distortion of the prismatic structure adversely effects the efficiency. For instance, if the prismatic structure is formed of a thermoplastic, the structure can distort if it is overstressed, thereby decreasing the efficiency of the retroreflective structure. One solution is to form a prismatic structure with a hard polymer. However, if the support sheeting is formed of a thermoplastic, a suitable weld is difficult to form between the thermoplastic sheets, thereby allowing the formed structure to tear easily along the weld. Furthermore, cube-corner retroreflective elements have low angularity, i.e., the element will only brightly retroreflect light that impinges on it within a narrow angular range centering approximately on its optical axis. Low angularity arises by the inherent nature of these elements, which are trihedral structures having three mutually perpendicular lateral faces. The elements are arranged so that light to be retroreflected impinges into the internal space defined by the faces, and retroreflection of the impinging light occurs by internal reflection of the light from face to face of the element. Impinging light that is inclined substantially away from the optical axis of the element (which is the trisector of the internal space defined by the faces of the element) strikes a face at an angle less than its critical angle, thereby passing through the face rather than being reflected.

Further details concerning the structures and operation of cube-corner microprisms can be found in U.S. Pat. No. 3,684,348, issued to Rowland on Aug. 15, 1972, the teachings of which are incorporated by reference herein. A method for making retroreflective sheeting is also disclosed in U.S. Pat. No. 3,689,346, issued to Rowland on Sep. 5, 1972, the teachings of which are incorporated by reference herein. The disclosed method is for forming cube-corner microprisms in a cooperatively configured mold. The prisms are bonded to sheeting which is applied thereover to provide a composite structure in which the cube-corner formations project from one surface of the sheeting.

SUMMARY OF THE INVENTION

A method for forming a retroreflective sheeting includes the steps of providing a first thermoplastic polymer layer and forming a rigid prism array on the first thermoplastic polymer layer. A second thermoplastic layer is applied to the prism array. The first thermoplastic layer is welded to the second thermoplastic layer while applying a die to the first and second thermoplastic layers to dislocate a portion of the rigid prism array, thereby allowing the first thermoplastic layer to be bonded to the second thermoplastic layer at said portion.

The retroreflective structure includes a first thermoplastic polymer layer and a rigid prism array attached to the first thermoplastic polymer layer. A second thermoplastic layer has a portion of the second thermoplastic layer welded to the first thermoplastic layer through the prism array.

The invention has many advantages including providing a high strength weld which renders the sheeting resistant to tearing at the welds. The elements of the prism array are formed of a rigid polymer which allow the elements to retain their optical characteristics better than nonrigid elements after having been subject to stretching. Clothing apparel, such as running suits, can have the retroreflective structure attached to an outer surface of said apparel to enhance visibility of the wearer.

Figure 1:
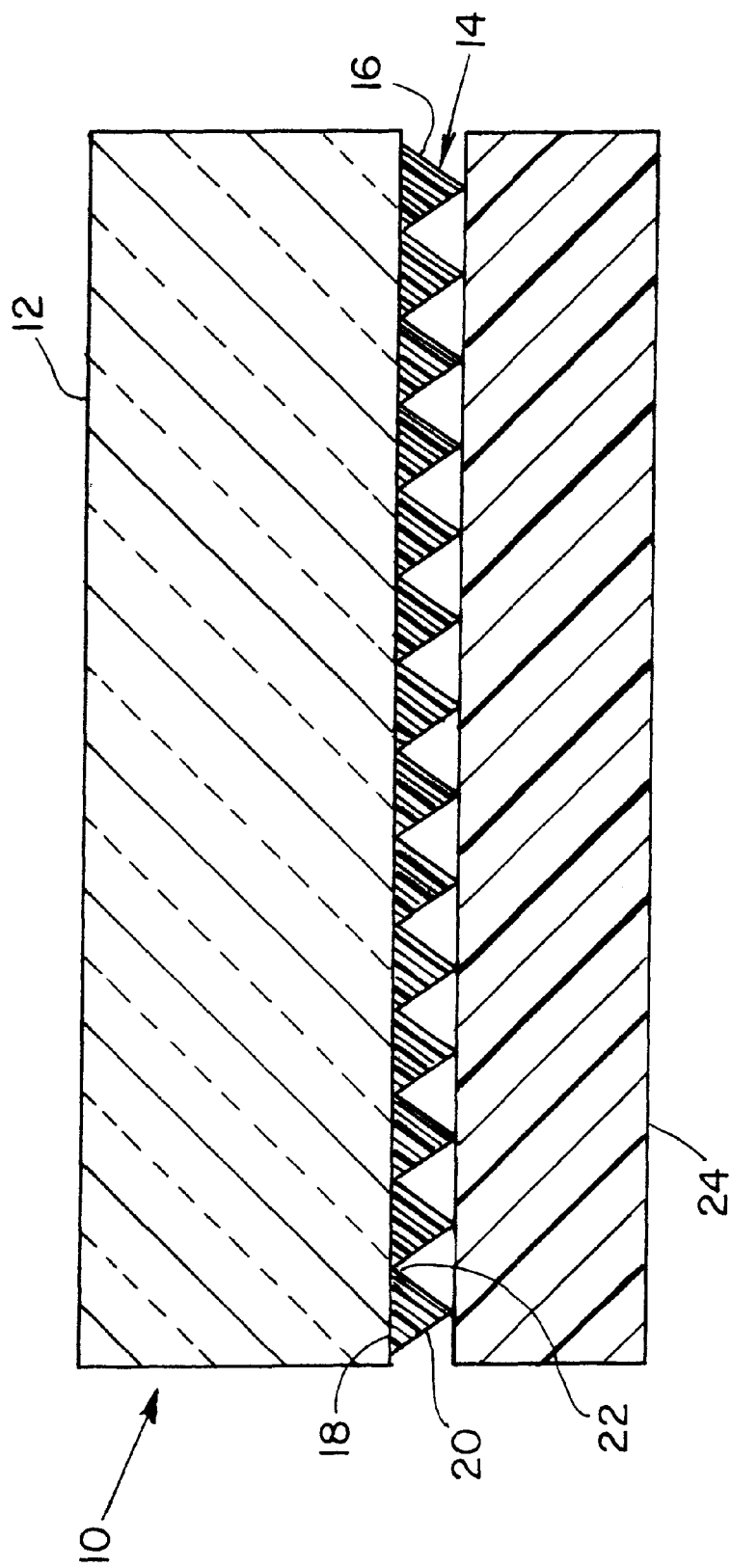
FIG. 1 is a cross-sectional view of the first embodiment of a retroreflective structure of the present invention prior to welding.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The features and other details of the method and apparatus of the invention will now be more particularly described with reference to the accompanying drawings and pointed out in the claims. The same numeral present in different figures represents the same item. It will be understood that the particular embodiments of the invention are shown by way of illustration and not as limitations of the invention. The principal features of this invention can be employed in various embodiments without departing from the scope of the invention.

Retroreflective structure 10, as shown in FIG. 1, has a base film 12 that is comprised of a transparent thermoplastic film, such as polyvinyl chloride, polyvinylidene chloride, urethane films, polyfluorocarbon polymers, etc., which has a low temperature of distortion. In one embodiment, a low temperature of distortion is considered to be about 180° F. (82° C.). The distortion temperature is the temperature at which a polymer melts and begins to flow. In another embodiment, the thermoplastic is an ethylene-tetrafluoroethylene copolymer. Base film 12 can be transparent to visible light and can be either clear or colored. An example of a suitable base film 12 is a polyvinyl chloride film available from Renoliot Corp. under the trademark Renoliot™ H1W series. Base film 12 can have a thickness in the range of between about 0.003 and 0.02 inches (0.0076 and 0.051 cm). In a preferred embodiment, the thickness is in the range of between about 0.0085 and 0.022 inches (0.022 and 0.056 cm). The selected thickness is dependent upon the method of fabrication, such as radio high frequency welding or ultrasonic welding, the thermoplastic selected, and the characteristics desired for the retroreflective structure.

The prism array 14, which can include retroreflective cube-corner prism elements 16, is formed on the base film 12. Prism array 14 has a window side 18 and facet sides 20 and is attached on window side 18 to the base film 12. Prism array 14 is formed of a transparent polymer that has a high temperature of distortion, which is the temperature at which the polymer melts and flows. The temperature of distortion for the polymer in the prism array 14 is sufficiently higher than the temperature of distortion for the polymer in the base film, thereby allowing the polymer in the base film to melt before the polymer in the prism array when exposed to a heating source. For example, the difference in temperatures of distortion for the two polymers is preferred to be greater than about 100° F. (56° C.) and preferably greater than about 150° F. (83° C.). In one embodiment, the temperature of distortion of the polymer of prism array 14 is about 350° C. (177° C.). After being formed, the polymer is substantially rigid at room temperature, which is defined as being substantially inflexible. This rigidity of the polymer in the prism array allows the prism elements to retain their optical characteristics. The prism array polymer can also be nonextensible, which is defined as not being capable of being substantially stretched without breaking. The polymer is selected from a wide variety of polymers which include the polymers of urethane, acrylic acid esters, cellulose esters, ethylenically unsaturated nitrites, hard epoxy acrylates, etc. Other polymers include polycarbonates, polyesters and polyolefins, acrylated silanes, hard polyester urethane acrylates. Preferably, the polymer can be cast in a prismatic mold with a monomer or oligomer polymerization initiated by ultraviolet radiation.

The prisms elements 16 of the prism array 14 can be cube-corner in shape and have a length along each cube-side edge in the range of between about 0.004 and 0.02 inches (0.01 and 0.051 cm). In one embodiment, each cube-side edge has a length of about 0.006 inches (0.015 cm). Preferably, each cube-side edge has a length of between about 0.004 and 0.008 inches (0.01 and 0.02 cm).

The thickness of prism array 14 at valley 22, where the rigid prism elements intersect, is sufficiently thin so that the prism array 14 can crack and split along the valleys 22 when a minimal force is applied to retroreflective structure. In one embodiment, the thickness of prism array 14 is in the range of between about 0.0028 and 0.009 inches (0.007 and 0.023 cm).

The base film 12 provides a substrate for prism array 14 to provide a smooth surface upon which the prism elements 16 can attach, preferably to the window side 18 of the prism elements 16. The prism array 14 can be laminated to the base film 12 with a transparent adhesive. Alternatively, the prism array 14 can be cast directly onto the base film 12.

Backing film 24 is placed on the facet side 20 of the prism array 14. The backing film 24 can be formed of a thermoplastic having a temperature of distortion that is about the same as base film 12. For instance, backing film 24 can be formed from a thermoplastic, such as a polyvinyl chloride, polyvinylidene chloride, urethane films, polyfluorocarbon polymers including an ethylene-tetrafluoroethylene copolymer, etc., which has a low temperature of distortion. The thermoplastic of backing film 24 is transparent to visible light and is either clear or colored. In a preferred embodiment, the base film 12 and backing film 24 both include polyvinyl chloride. Backing film 24 can have a thickness in the range of between about 0.005 and 0.02 inches (0.013 and 0.051 cm).

Unlike standard vinyl retroreflective sheeting, the present structure is not constructed purely of vinyl. While both materials have dipole structures and are susceptible to high frequency (dielectric) action, their heat distortion temperatures can be more than about 190° F. (106° C.) apart. The heat distortion temperature is the temperature at which the polymer begins to flow. The thermoplastic base film 12 has a heat distortion temperature of about 180° F. (82° C.), while the nonvinyl materials can have a distortion temperature of about 350° F. (177° C.).

The prism array 14 appears to act as barrier to the welding of the first layer, base film 12, to the second layer, backing film 24. An effective way to weld and form the sheeting is to move the prisms out of the way and allow the thermoplastic in the base film 12 and the backing film 24 to form a bond. The pyramidal shape of the prisms promotes instability and if the base film 12 can be softened, the prisms will move or tumble out of the way.

High frequency welding is the joining of two thermoplastic surfaces by melting under heat and pressure, which is brought about by molecular friction. Molecules within the material are subject to internal stresses caused by an electrical field alternating in polarity several million times per second. When the heat exceeds the melting point (distortion temperature) of the base film 12 under pressure, the two surfaces collapse and meld, thus forming a joint.

Figure 2:
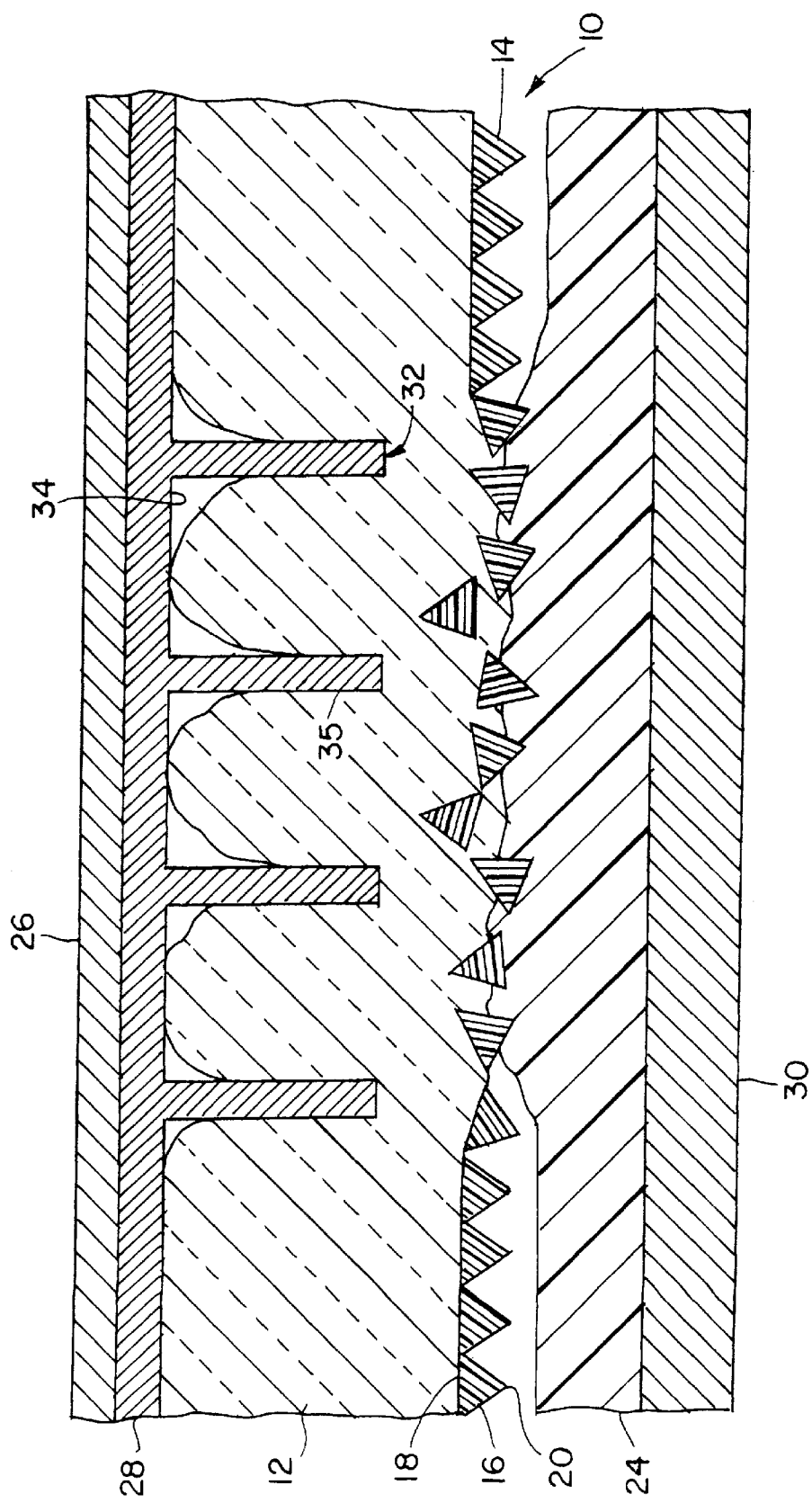
FIG. 2 is a cross-sectional view of the first embodiment of the retroreflective structure of the present invention after welding.

The welding can be performed by the use of radiation frequency or dielectric sealing equipment. Suitable welding equipment includes equipment sold under the tradenames, Thermatron, Kosmos, Kiefel and Callaghan. The equipment operates on the principle of a generator producing radio energy at a frequency of about 27.12 MHz. As shown in FIG. 2, the press has an upper platen 26 with a die 28 and a lower platen 30. Although not shown, lower platen 30 can also have a die. Alternatively, only the lower die can have a die. In the raised or up position, the base film 12 with prism array and the backing film 24 are laid against the die 28 that has a seal pattern 32. Upon closure of the press, high frequency radio energy is applied, causing the polar molecules in the base film 12 and the backing film 24 to become agitated and heated to their temperature of distortion and melting point, while being sufficiently low as not to distort the polymer of the prism array 14.

The die 28, which is pressed against the two films, contains lands 34 and edges 35. The prism elements 16 move and allow the two films to meet and thus meld or join together. The amount of this welding is controlled by time, temperature and radio frequency power level. For example, in forming a polymer chloride sheeting with acrylated-epoxy prisms and a reinforced polyvinyl chloride backing at a rate of six feet per second, platen pressure can be about 50–60 psi and a platen temperature of about 115–125° F. (46–52° C.). The radio energy can be about 9.5 kWatts. The platen current can be about 1.5 amps, and a grid current can be about 0.9 amps. Pressure can be applied by the heated platens for a preseal step of about one second prior to exposure to the radio frequency, then for a sealing step of about 2.4 seconds while the sheeting and prisms are exposed to the radio energy and then for a cooling step after exposure to the radio energy for about one second.

In a preferred embodiment, the die employed is etched brass. The die can also be formed of magnesium, etched steel, copper or any other suitable die making material known in the art. The die has an outer tear seal, which is a sharp edge. This allows the formed retroreflective structure to be removed from the skeleton, or waste, around the perimeter of the retroreflective structure 10. For a magnesium die, the inner seal widths are referred to as 9 point line weight (0.013 inches), which is an indication of their etched width. However, the line weights can range from about 0.1 to 3.0 points, which is about 0.001 to 0.042 inches. These inner seals are then machined down about 0.014 inches (0.036 cm) below the height of the tear seal in order not to tear the inner cells. In the case of a brass die, the inner seals are kept to a height of about 0.008 inches below the surface of a tear seal. The brass die can either be machined from a solid piece of brass or constructed from pieces of brass rule.

Figure 3:
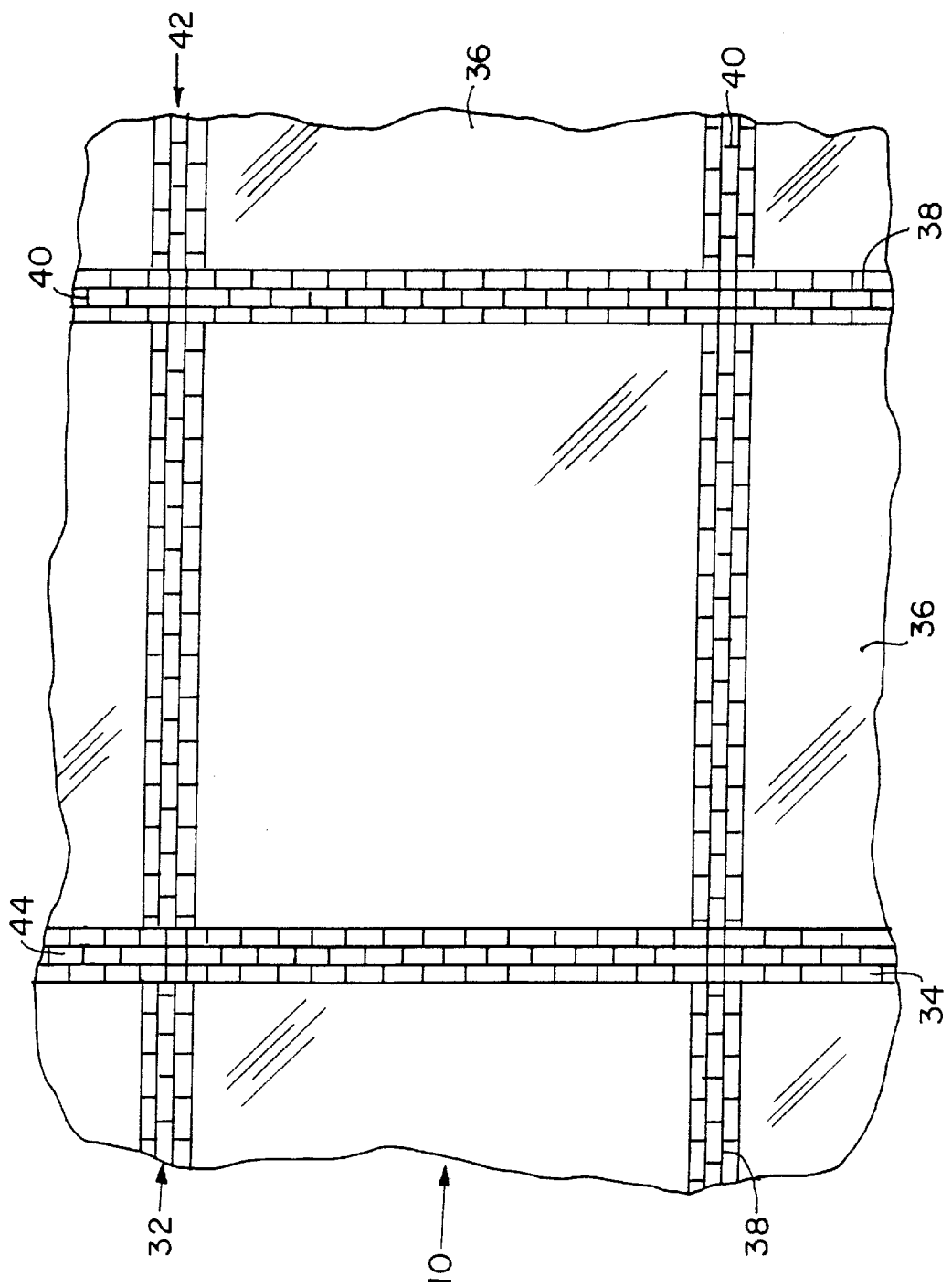
FIG. 3 is a partial top view of the first embodiment of the retroreflective structure of the present invention after welding.
Figure 4:
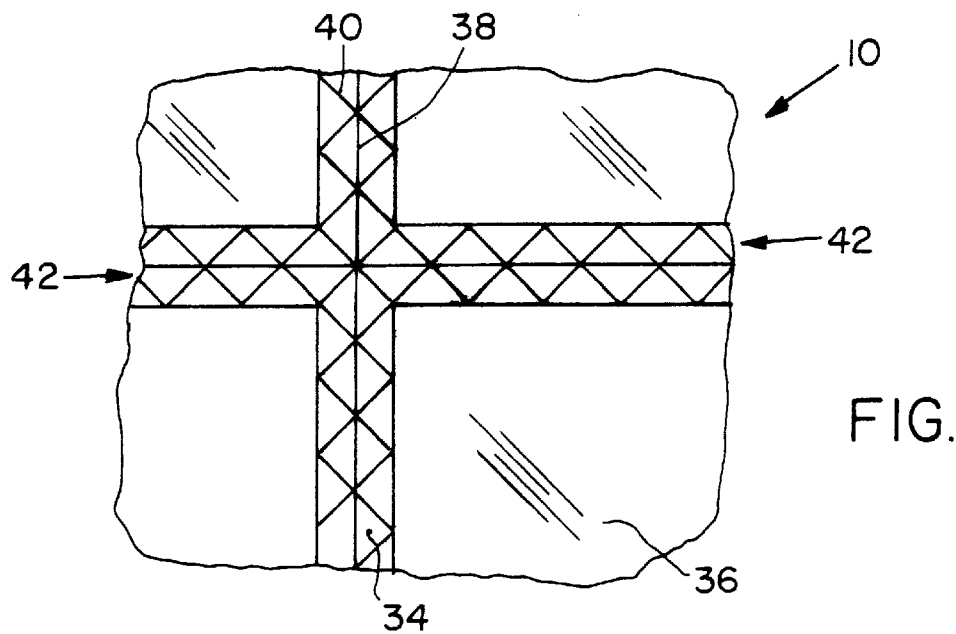
FIG. 4 is a partial top view of a second embodiment of the retroreflective structure of the present invention.

As shown in FIG. 3, the inner seal on the die 28 form a plurality of cells 36 with a multi-course, hatched pattern perimeter, which when applied to the base film 12 (first thermoplastic polymer layer), the prism array 14, and the backing film 24 (second thermoplastic polymer layer) cause a portion of the prism array 14 (not shown in FIG. 4) to dislocate, thereby allowing the first thermoplastic layer to bond to the second thermoplastic layer. The cells 36 are preferably a half to one inch in length and width. The perimeters of the cells 36 are formed of multiple courses 38 with hatches 40. A product, such as a tape, has an edge that is generally sealed on both sides having a width of about 0.25 inches (0.64 cm). This seal, which is air tight, is made in a certain pattern, and a brick type having several layers wide along the edges has been found to be superior. Other patterns can include squares, diamonds, triangles, etc. In one embodiment, the pattern is a plurality of offset rows of rectangles 42 (a brick pattern), wherein the rectangles are about 0.0625 by 0.125 inches (0.16 by 0.32 cm). The lands 34 of the die 28 can be flat thus forming a uniform indention for each rectangle. Preferably, there are three rows of offset rectangles. In another example, a plurality of offset rows of squares can form the pattern. In another example, as shown in FIG. 4, the rows can be formed of triangles. In one embodiment, the triangles have a height of about 0.125 inches (0.32 cm).

The multi-course, hatched pattern provides strength to the sealed product. It also provides a pocket in each cell 36, so that if one section of a product should fail by tearing, ripping or leaking, the remainder of the retroreflective structure is still operating both cosmetically and reflectively.

Another important consideration is the thickness of the base film 12. The base film 12 should have a thickness in the range of between about 0.0085 and 0.011 inches (0.022 and 0.028 cm) in thickness. If the base film 12 is too thin, the material does not weld together with much strength. If it is too thick, the prisms will not move out of the way, and the material will not melt together.

Figure 5:
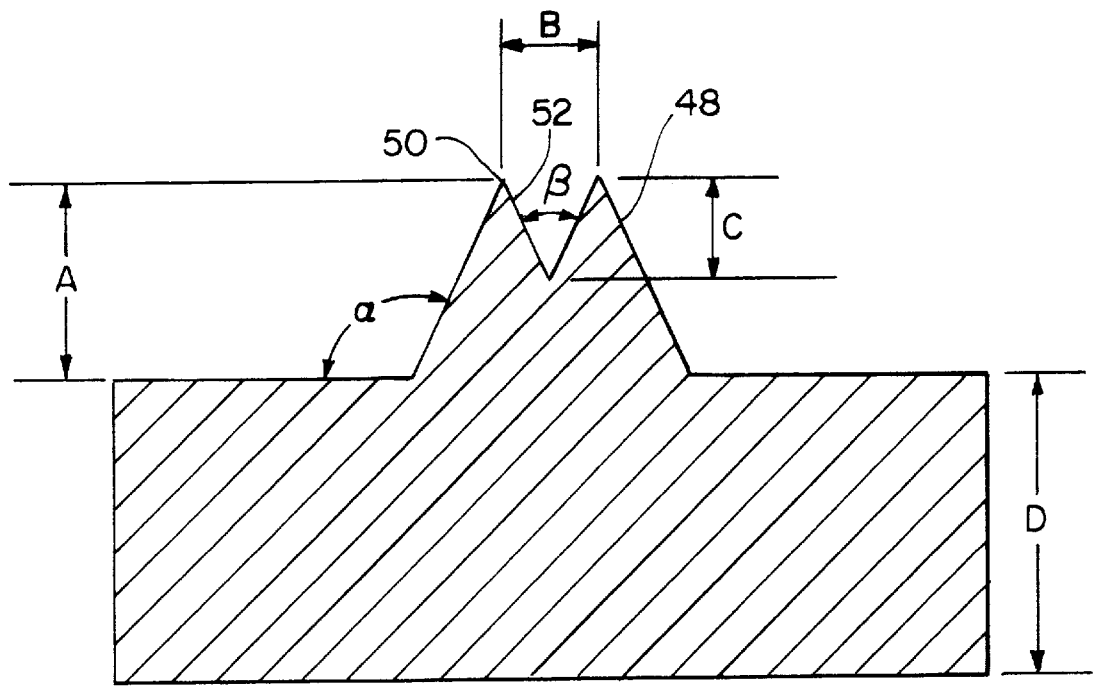
FIG. 5 is a cross-sectional view of a third embodiment of a mold for forming a retroreflective structure of the present invention.
Figure 6:
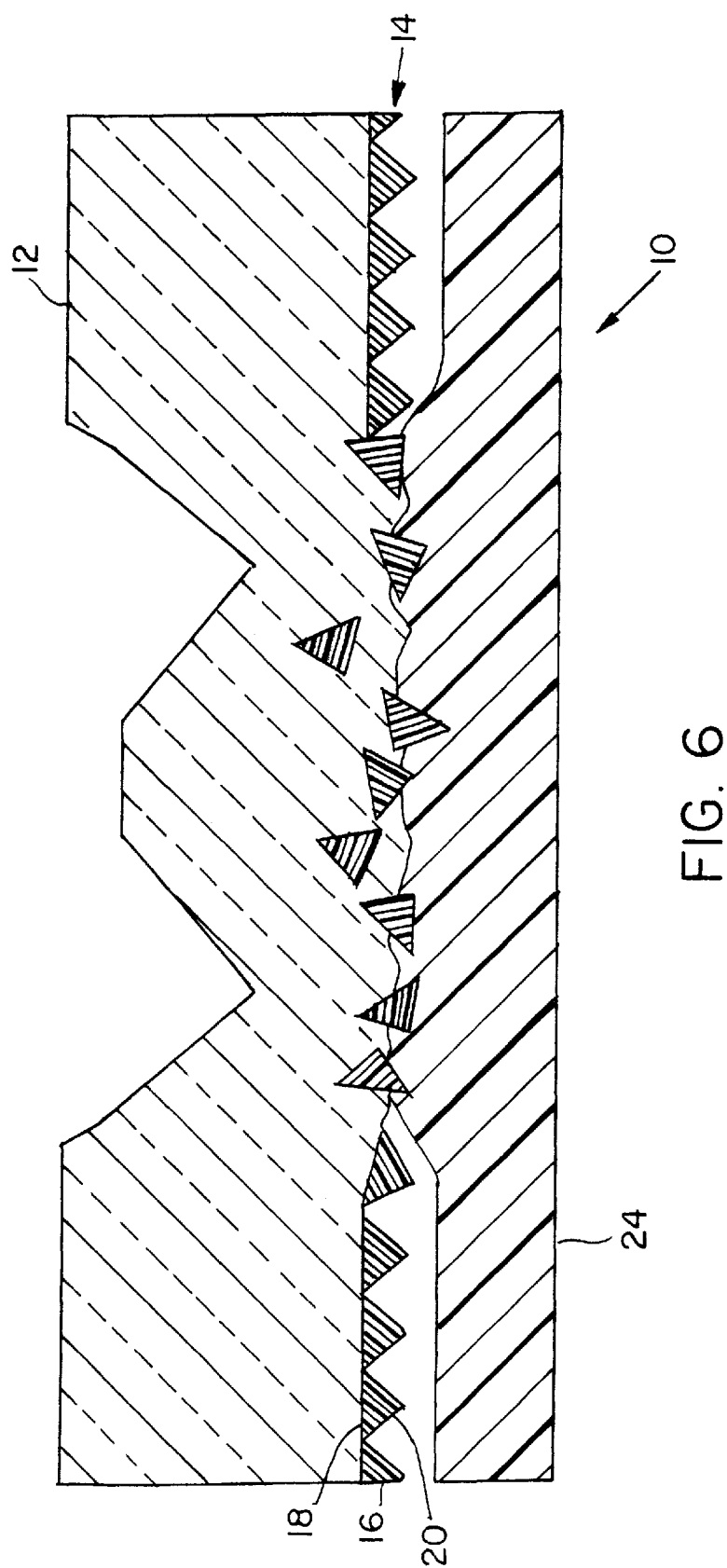
FIG. 6 is a cross-sectional view of the mold and retroreflective structure with the mold extending into the backing film.
Figure 7:
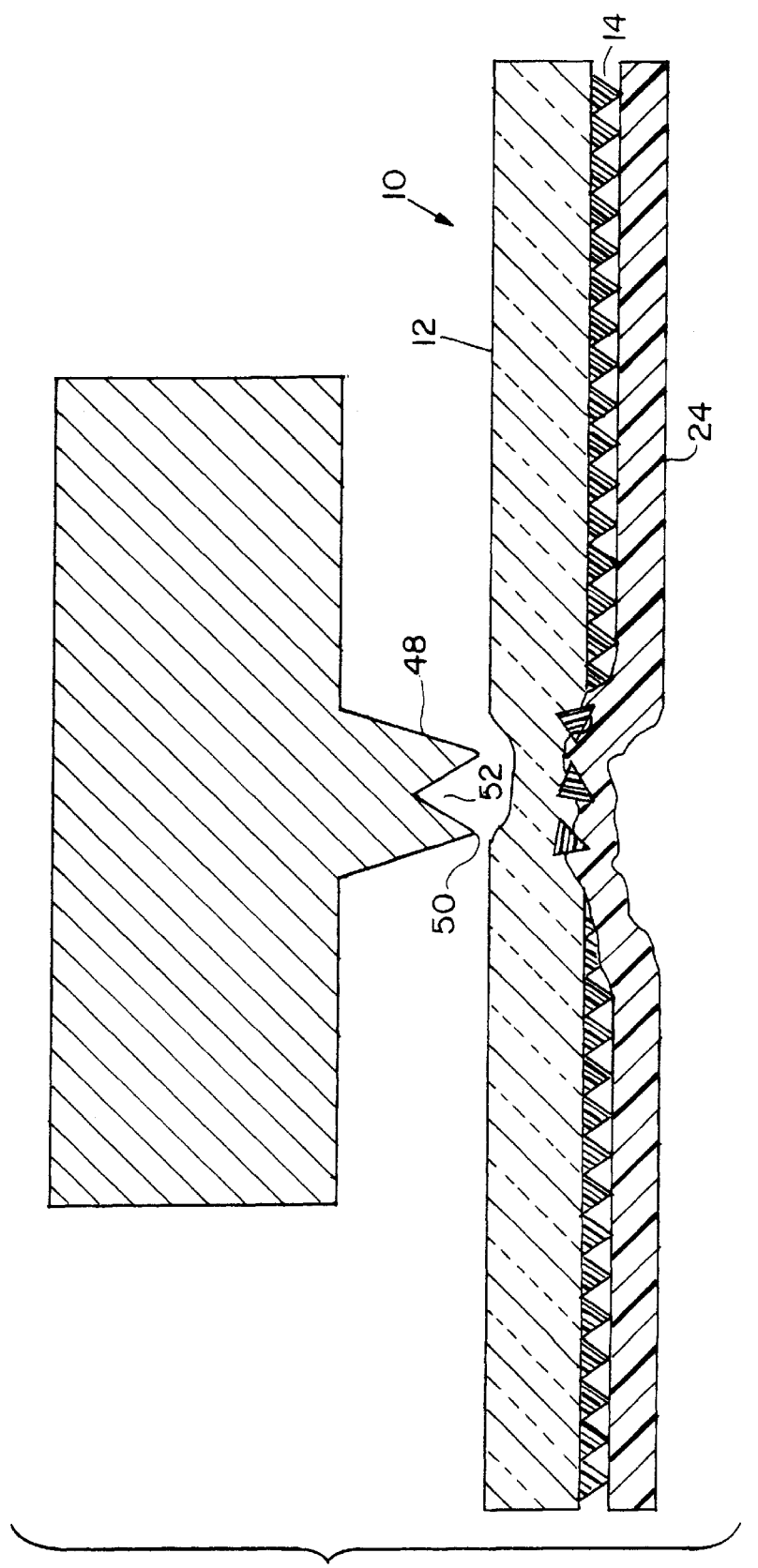
FIG. 7 is a cross-sectional view of the mold and retroreflective structure with the mold having been extended through the backing film and into the base film.

In another embodiment, as shown in FIG. 5, a bar seal die land can be modified from a flat surface to a "M" shape 48. This design promotes movement of the prisms and allow the vinyl substrates to form a weld. In one embodiment, the height of the prongs from the platen is about a tenth of an inch (A) and at an angle α from the platen, which can be about 120°. Prongs 50 are separated by a distance (B) of about 0.018 inches (0.046 cm) and having a depth (C) of about 0.015 inches (0.038 cm). Trough 52 can have an angle of about β, which can be about 60°. The die has a thickness (D) of about 0.25 inches (0.064 cm). This design causes the prisms in the array to be moved out of the way, allowing the base film and backing film to weld together. In FIG. 6, the die seal is shown extending into the backing film 24. In FIG. 7, the die seal had been extended through the base film 12.

Energy can be also supplied by ultrasonic energy, infrared energy or induction heating for joining the layers. Suitable ultrasonic welding equipment includes equipment sold under the trade names of Branson and Dukane. In a continuous web process, the base film 12, prism array 14 and a backing film 24 of about 0.0085 inches (0.022 cm) are brought together into a rotating die which has inner seals and a pattern, either diamond or stripped. The tape then proceeds to a second station, where the edges are sealed together with a rotating wheel cutter. If the wheel cutter is not rotating, the material does not seal nor can the inner seals and the edge seals be put onto the tape at the same station. Ultrasonic plunge sealers have also been used to seal the edges of a previously radio frequency sealed product, allowing a cone or ring to be welded together. For instance, the ultrasonic frequency can be twenty kHz at a power level of about 1,000 to 2,000 watts. The retroreflective sheeting can be formed at a rate of 10 to 40 feet per minute.

The heat in high frequency welding is generated at the mid-point between the upper and lower platens. Since the melting temperature of the polymer in the prism layer is almost twice as high as the thermoplastic films, it is important that the shape of sealing die promote the movement of the prism structure out of the way and permit the two components to heat up and bond together.

Care must be taken to insure that the base film 12, prism array 14 and backing film 24 interface is at the midpoint of the upper and lower platens in order to optimize the heat generated by the high frequency energy. For this reason, it is generally better to use a thicker backing material than that is used with all vinyl structures in order to provide sufficient vinyl to form a weld.

The seal dwell time and dielectric current settings required to form the welds are generally 10–20% higher than those used in traditional high frequency welding. Normal seal dwell times and dielectric settings should be used as a base line to begin process optimization. Clamping pressures should be lower than those used in traditional high frequency welding. High frequency welding machines vary in regard to power output and pressure from manufacturer to manufacturer and even between machines of the same model. As a rule, it is prudent to evaluate the performance of each machine for different dies and backings as settings may vary from machine to machine.

Too much clamp pressure or an uneven platen or die or both can result in oversealing. Oversealing can weaken the material around the weld and can cause an uneven surface making printing difficult. Sealing through the backing can result in a slightly uneven front surface. If the depth of seal is not too great, if too little pressure is applied, the prisms do not sufficiently move, and this results in no weld at all.

The platen and dies must be as level as possible in order to weld nonvinyl prism sheeting. This is especially true when bar sealing. Down stops should be employed to prevent the die from pushing too far into the substrates.

Weld strength can be tested by the following methods: Cutting into the material and pulling the two substrates apart. The weld is adequate for most applications if either of the films tear before the weld. Soaking the retroreflective structure in room temperature water for 24 hours. Leakage into any of the cells constitutes a failure. Soaking the retroreflective structure in a water bath with an initial temperature of 150° F. (66° C.) and allowing the bath cool to room temperature. This method expands the air in the welded cell, stressing the weld, as the water cools, water will be pulled into the cell as the air contracts, thereby stretching the material. In general, the most reliable test is to cut into a sample of the material and attempt to separate the substrates. If the sealing equipment is properly calibrated, the dies and platens are leveled and the platen temperatures and dielectric settings are maintained, only periodic testing should be needed to verify the weld performance.

Equivalents

While the invention has been particularly shown and described with reference to a preferred embodiment thereof, it will be understood by those skilled in the art that various changes in form and details may be made therein without departing from the spirit and scope of the invention as defined by the appended claims.

What is claimed is:

1. A method for forming a retroreflective sheeting, comprising the steps of:
    a) providing a first light transparent thermoplastic polymer layer;
    b) forming prism elements in a prism array on the first thermoplastic polymer layer, said prism elements being formed of a polymer material which is light transparent and substantially inflexible at room temperature;
    c) applying a second thermoplastic layer to the prism array on a side of the array opposite the first layer; and
    d) welding the first thermoplastic layer to said second thermoplastic layer, while applying a die to said layers to dislocate a portion of the prism elements of the prism array, whereby the first thermoplastic layer bonds to the second thermoplastic layer at said portion, thereby forming the retroreflective sheeting.

2. The method of claim 1 wherein said first thermoplastic polymer layer has a thickness in the range of about 0.003 to 0.022 inches.

3. The method of claim 1 wherein said first thermoplastic polymer layer has a thickness in the range of about 0.085 to 0.02 inches.

4. The method of claim 1 wherein said first thermoplastic polymer layer has a thickness in the range of about 0.085 to 0.011 inches.

5. The method of claim 1 wherein the first thermoplastic layer is selected from a group consisting of polyvinyl chloride, polyvinylidene chloride, polyurethane and polyfluorocarbon.

6. The method of claim 5 wherein the second thermoplastic layer is selected from a group consisting of polyvinyl chloride, polyvinylidene chloride, polyurethane and polyfluorocarbon.

7. The method of claim 1 wherein the rigid prism array is formed of a polymer selected from a group consisting of epoxy polyacrylates, polyurethane, polynitriles, polycarbonates, polyesters and polyolefins.

8. The method of claim 1 wherein the rigid, prism array is formed of more than one polymer.

9. The method of claim 1 wherein the die includes a land having at least one flat.

10. A method for forming a retroreflective sheeting, comprising the steps of:
    a) providing a first layer having a first light transparent thermoplastic polymer;
    b) forming prism elements in a prism array on the first thermoplastic polymer layer, said prism elements being formed of a polymer material which is light transparent and substantially inflexible at room temperature and that has a substantially higher distortion temperature than the distortion temperature of the first light transparent thermoplastic polymer layer;
    c) applying a second thermoplastic polymer layer to the prism array on a side of the array opposite the first layer, wherein the second thermoplastic layer has a distortion temperature that is about the same as the first light transparent thermoplastic polymer layer; and
    d) welding the first layer to the second layer, while applying a die to said layers to dislocate a portion of the prism elements of the prism array, whereby the first layer bonds to the second layer at said portion, thereby forming the retroreflective sheeting.

11. The method of claim 10 wherein the first thermoplastic polymer layer and the second thermoplastic polymer layer include the same polymer.

12. The method of claim 10 wherein the first thermoplastic polymer layer includes a polyvinyl chloride.

13. The method of claim 10 wherein the second thermoplastic polymer layer includes a polyvinyl chloride.

14. The method of claim 10 wherein the polymer material of the light transparent prism elements includes an epoxy or carbonate.

15. The method of claim 10 wherein the first thermoplastic polymer layer and the second thermoplastic polymer layer have a heat distortion temperature of about 180° F.

16. The method of claim 10 wherein the polymer material of the light transparent prism elements has a heat distortion temperature of above about 350° F.

17. The method of claim 10 wherein the die includes a land having at least one flat.

* * * * *